(12) United States Patent
D'Ercole et al.

(10) Patent No.: US 12,266,359 B2
(45) Date of Patent: Apr. 1, 2025

(54) SYSTEM(S) AND METHOD(S) TO ENABLE MODIFICATION OF AN AUTOMATICALLY ARRANGED TRANSCRIPTION IN SMART DICTATION

(71) Applicant: GOOGLE LLC, Mountain View, CA (US)

(72) Inventors: Nicolo D'Ercole, Oberrieden (CH); Shumin Zhai, Zurich (CH); Swante Scholz, Zurich (CH); Mehek Sharma, Thalwil (CH); Adrien Olczak, Irvine, CA (US); Akshay Kannan, Fremont, CA (US); Alvin Abdagic, Zurich (CH); Julia Proskurnia, Zurich (CH); Viesturs Zarins, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 287 days.

(21) Appl. No.: 17/902,560

(22) Filed: Sep. 2, 2022

(65) Prior Publication Data
US 2024/0029728 A1 Jan. 25, 2024

Related U.S. Application Data

(60) Provisional application No. 63/390,830, filed on Jul. 20, 2022.

(51) Int. Cl.
*G10L 15/22* (2006.01)
*G06F 16/683* (2019.01)
*G10L 15/08* (2006.01)
(52) U.S. Cl.
CPC ............ *G10L 15/22* (2013.01); *G06F 16/685* (2019.01); *G10L 15/08* (2013.01)

(58) Field of Classification Search
None
See application file for complete search history.

(56) References Cited

U.S. PATENT DOCUMENTS 6,067,514 A * 5/2000 Chen ..................... G10L 15/18
704/235
9,135,231 B1 * 9/2015 Barra .................... G06F 40/151
(Continued)

FOREIGN PATENT DOCUMENTS

WO         8904035         5/1989

OTHER PUBLICATIONS

Spinelle et al.; An Intonational Cue to Word Segmentation in Phonemically Identical Sequences; vol. 72/3; 14 pages; dated Apr. 1, 2010.

(Continued)

*Primary Examiner* — Douglas Godbold
(74) *Attorney, Agent, or Firm* — Gray Ice Higdon

(57) ABSTRACT

Implementations described herein generally relate to generating a modification selectable element that may be provided for presentation to a user in a smart dictation session with an automated assistant. The modification selectable element may, when selected, cause a transcription, that includes textual data generated based on processing audio data that captures a spoken utterance and that is automatically arranged, to be modified. The transcription may be automatically arranged to include spacing, punctuation, capitalization, indentations, paragraph breaks, and/or other arrangement operations that are not specified by the user in providing the spoken utterance. Accordingly, a subsequent selection of the modification selectable element may cause these automatic arrangement operation(s), and/or the textual data locationally proximate to these automatic arrangement operation(s), to be modified. Implementations described herein also relate to generating the transcription and/or the (Continued)

modification selectable element on behalf of a third-party software application.

18 Claims, 10 Drawing Sheets

(56) References Cited

U.S. PATENT DOCUMENTS

| | | | | |
|---|---|---|---|---|
| 11,886,801 | B1* | 1/2024 | Li | G06F 3/04842 |
| 2003/0050778 | A1* | 3/2003 | Nguyen | G10L 15/1815 |
| | | | | 704/E15.047 |
| 2004/0138881 | A1* | 7/2004 | Divay | G10L 15/22 |
| | | | | 704/E15.025 |
| 2008/0270895 | A1* | 10/2008 | Dam Nielsen | G06F 40/274 |
| | | | | 715/256 |
| 2009/0076792 | A1* | 3/2009 | Lawson-Tancred | |
| | | | | G06F 40/106 |
| | | | | 704/2 |
| 2014/0297276 | A1* | 10/2014 | Tachimori | G06F 40/166 |
| | | | | 704/235 |
| 2017/0263248 | A1* | 9/2017 | Gruber | G06F 40/166 |
| 2018/0018308 | A1* | 1/2018 | Zuo | G06F 40/166 |
| 2018/0053510 | A1* | 2/2018 | Kofman | G11B 27/34 |
| 2018/0329622 | A1* | 11/2018 | Missig | G06F 3/04886 |
| 2020/0126558 | A1* | 4/2020 | McLean | H04M 1/2476 |
| 2020/0167379 | A1 | 5/2020 | Faruqui et al. | |
| 2020/0175961 | A1* | 6/2020 | Thomson | G10L 15/28 |
| 2020/0243094 | A1* | 7/2020 | Thomson | G10L 15/28 |
| 2021/0233522 | A1* | 7/2021 | Kikin-Gil | G10L 15/22 |
| 2021/0294971 | A1* | 9/2021 | Willis | G06F 40/253 |
| 2022/0139386 | A1* | 5/2022 | Li | G06F 40/126 |
| | | | | 704/9 |
| 2023/0306963 | A1* | 9/2023 | Todorov | G10L 15/05 |
| 2023/0352009 | A1* | 11/2023 | Behre | G06F 40/279 |
| 2024/0144931 | A1* | 5/2024 | Pathak | G06F 40/232 |

OTHER PUBLICATIONS

European Patent Office; International Search Report and Written Opinion issued in Application No. PCT/US2022/080037; 12 pages; dated Mar. 23, 2023.

* cited by examiner

SYSTEM(S) AND METHOD(S) TO ENABLE MODIFICATION OF AN AUTOMATICALLY ARRANGED TRANSCRIPTION IN SMART DICTATION

BACKGROUND

Humans can engage in human-to-computer dialog sessions with interactive software applications referred to herein as "automated assistants" (also referred to as "chat bots," "interactive personal assistants," "intelligent personal assistants," "personal voice assistants," "conversational agents," etc.). Automated assistants typically rely upon a pipeline of components in interpreting and responding to various inputs from humans (which when interacting with an automated assistant may be referred to as "users"). For example, an automatic speech recognition (ASR) engine can be used to process audio data that captures a spoken utterance of a user, and to generate ASR output, such as textual data corresponding to the spoken utterance (i.e., a sequence of term(s) and/or other token(s)). Further, a natural language understanding (NLU) engine can be used to process the ASR output, and to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain content that is responsive to the spoken utterance or cause some action to be performed responsive to the spoken utterance.

In some cases, automated assistants may be utilized to dictate transcriptions for a variety of different purposes. For example, a user can provide spoken utterances to the automated assistant, and the automated assistant can process, using the ASR engine, the spoken utterances to generate the transcriptions for inclusion in text messages, e-mails, notes, etc. In some of these cases, the user often has to include specific arrangement operations in the spoken utterance (e.g., by speaking "period", by speaking "capitalize", etc.). However, including these specific arrangement operations in the spoken utterance increases a quantity of user inputs and/or a length of user inputs provided by the user and requires automated assistants to perform additional processing on the spoken utterance to determine the intent of the user in providing these specific arrangement operations, thereby unnecessarily wasting computational resources. Moreover, including these specific arrangement operations in the spoken utterance is not natural for the user and may result in the user losing their train of thought while dictating the transcription, which may result in the user providing further user inputs and prolonging to the human-to-computer dialog, thereby unnecessarily wasting computational resources.

Although many automated assistants are now capable of automatically arranging textual data for transcriptions (i.e., without the user having to include these specific arrangement operations in the spoken utterance), these automated assistants may still make errors. As a result, in some of these cases, the user often has to manually manipulate the textual data with additional arrangement operations in order to format the textual data with a desired arrangement (i.e., desired spacing, punctuation, capitalization, indentations, paragraph breaks, etc.). However, the user having to manually manipulate the textual data also increases a quantity of user inputs provided by the user, thereby unnecessarily wasting computational resources. Accordingly, there is a need in the art for improved techniques related to quickly and efficiently modifying automatic arrangement of textual data in smart dictation.

SUMMARY

Some implementations described herein relate to an automated assistant that may generate textual data corresponding to a spoken utterance provided by a user of a client device, generate a transcription that is automatically arranged (i.e., in a manner that is not explicitly detailed by the user in the spoken utterance), and generate a modification selectable element that, when subsequently presented and selected by the user, causes the transcription that is automatically arranged to be modified. For example, processor(s) of the client device may receive audio data that captures the spoken utterance via microphone(s) of the client device, process, using an automatic speech recognition (ASR) model, the audio data that captures the spoken utterance to generate the textual data, generate the transcription that is automatically arranged based on at least the textual data corresponding to the spoken utterance, cause the transcription to be provided for presentation to the user via a display of the client device, and generate the modification selectable element. Further, the processor(s) of the client device may receive touch input from the user that is directed to the transcription. Moreover, and in response to receiving the touch input from the user that is directed to the transcription and based on the transcription of the spoken utterance being automatically arranged, the processor(s) of the client device may cause the modification selectable element to be provided for presentation to the user via the display of the client device. Accordingly, implementations described here are directed to improved techniques for quickly and efficiently modifying the automatic arranged transcription. As a result, the automated assistant may guide the user to conclude the dictation session in a more quick and efficient manner by reducing the overall duration of time of the dictation session through use of the modification selectable element.

In various implementations, and upon selection of the modification selectable element, the modification to the automatic arrangement of the transcription may be based on automatic arrangement operations utilized to automatically arrange the transcription. For instance, the processor(s) of the client device may process, using one or more automatic arrangement machine learning (ML) models, the audio data that captures the spoken utterance and/or the textual data corresponding to the spoken utterance to generate automatic arrangement data. The one or more automatic arrangement ML models may include: an automatic punctuation ML model that is trained to identify, for inclusion in the automatic arrangement data, automatic punctuation marks for the transcription; automatic capitalization ML model to identify, for inclusion in the automatic arrangement data, automatic capitalizations for the transcription; an automatic paragraph break ML model that is trained to identify, for inclusion in the automatic arrangement data, automatic paragraph breaks for the transcription; an automatic line break ML model that is trained to identify, for inclusion in the automatic arrangement data, automatic line breaks for the transcription; and/or any other ML models that may be utilized in generating the automatic arrangement data for automatic arrangement of the transcription.

For example, assume that a user is utilizing an automated assistant (e.g., executing at least in part at a client device of the user) to dictate text for an email, and assume that the user intends a spoken utterance to be dictated as "You can use any resources to complete the exam." However, assume that the automated assistant generates a transcription of "You can use any resources. To complete the exam." Notably, in this example, the automated assistant inadvertently included a period after a given term of "resources" and inadvertently capitalized a subsequent term of "to" that is subsequent to the given term of "resources" and the inadvertent period. Accordingly, rather than the user having to manually remove the inadvertently included period after "resources" and manually decapitalize the inadvertently capitalized "to", the user may simply direct touch input to the inadvertent automatic arrangement in the transcription and be provided with a modification selectable element that, when subsequently selected by the user, automatically causes the transcription that was automatically arranged to be modified by removing the inadvertently included period after the given term of "resources" and by decapitalizing the inadvertently capitalized subsequent term of "to" as the user originally intended.

In this example, the selection of the modification selectable element may only cause the inadvertently capitalized subsequent term of "to" to be decapitalized if it is extrinsic capitalization that is only capitalized based on following the inadvertently included period. In contrast, assume that the word following the inadvertently included period was an intrinsic capitalization, such as an entity reference to an entity (e.g., references to persons, organizations, locations, and so forth). For instance, the personal pronoun "I" may be considered an intrinsic capitalization as an entity reference to the user based on grammar rules while other personal pronouns (e.g., "you", "she", "her", etc.) may not be considered intrinsic capitalization, proper nouns may be considered entity references to an entity (e.g., "Boston Red Sox" may be a proper noun that is an entity reference to a professional baseball team located in Boston, MA, "John" may be a proper noun that is an entity reference a person), and so on.

As another example, further assume that the user intends an additional spoken utterance to be dictated as "Please let me know if you have any questions. [paragraph break] Regards, Teacher" However, assume that the automated assistant generates a transcription of "[paragraph break] Please let me know if you have any questions. [paragraph break] Regards, Teacher", resulting in the transcription of "You can use any resources to complete the exam. [paragraph break] Please let me know if you have any questions. [paragraph break] Regards, Teacher" (e.g., when combined with the transcription from the prior example). Notably, in this example, the user may not have intended for there to be a paragraph break between the spoken utterances of "You can use any resources to complete the exam" and "Please let me know if you have any questions", but did intend for there to be a paragraph break between "Please let me know if you have any questions" and "Regards, Teacher". Similarly, in this example, the automated assistant inadvertently included an additional paragraph break beyond what the user intended. Accordingly, rather than the user having to manually remove the inadvertently included paragraph break, the user may simply direct touch input to the inadvertent automatic arrangement in the transcription and be provided with a modification selectable element that, when subsequently selected by the user, automatically causes the transcription that was automatically arranged to be modified by removing the inadvertently included paragraph break as the user originally intended.

Although the above examples are described with respect to modifications for inadvertent punctuation and inadvertent spacing, it should be understood that these examples are provided to illustrate techniques of the present disclosure and not meant to be limiting. Rather, it should be understood that techniques of the present disclosure may be utilized to provide a modification selectable element for any arrangement operations that are utilized to automatically arrange a transcription.

In various implementations, the touch input that is received from the user and this is directed to the transcription of the spoken utterance may be directed to various portions of the transcription to cause the modification selectable element to be provided for presentation to the user. Returning to the above example where the user intended the spoken utterance to be dictated as "You can use any resources to complete the exam.", but it was inadvertently automatically arranged as "You can use any resources. To complete the exam." In this example, the user may direct the touch input to the given term of "resources", the subsequent term of "to", and/or the inadvertently included period between the given term of "resources" and the subsequent term of "to". Put another way, the modification selectable element may only be provided for presentation to the user in response to determining that the touch input is locationally proximate to an automatically arranged portion of the transcription. Accordingly, it should be understood that the three locations the touch input may be provided to cause the modification selectable element to be provided for presentation to the user as described above is for the sake of example and is not meant to be limiting. Rather, it should be understood that the location(s) that the touch input may be directed to cause the modification selectable element to be provided for presentation to the user may vary not only based on the textual data included in the transcription, but also based on how the textual data is automatically arranged in the transcription.

In various implementations, the processor(s) may only generate the modification selectable element for automatically arranged portions of the transcription. Returning to the above example where the transcription was arranged as "You can use any resources. To complete the exam." In contrast, assume that after saying "resources", the user said "period" while dictating. In this example, and although grammatically incorrect (e.g., since the transcription includes two fragmented sentences), the processor(s) may refrain from generating the modification selectable element since the user explicitly stated "period" after resources. Nonetheless, other techniques may be utilized to alert the user to this grammatical error. Notably, other portions of the same transcription may still be automatically arranged, and the processor(s) may still generate the modification selectable element for those other automatically arranged portions of the transcription.

Other implementations described herein relate to an automated assistant that may generate the transcription and/or the modification selectable element as a service for third-party software application executing at least in part at the client device. For example, the processor(s) of the client device may generate the transcription that is automatically arranged based on at least the textual data corresponding to the spoken utterance in the same or similar manner as described above. In some versions of these implementations, the processor(s) may cause the transcription to be provided for presentation to the user via the display of the client device as described above, whereas in other versions of these implementations, the processor(s) may cause the transcription that is automatically arranged to be provided to the third-party software application which, in turn, causes the third-party software application to cause the transcription that is automatically arranged to be provided for presentation to the user via the display of the client device. In some versions of these implementations, the processor(s) may generate the modification selectable element, and may cause the modification selectable element to be provided to the third-party software application which, in turn, causes the third-party software application to cause the modification selectable element to be provided for presentation to the user in response to receiving the touch input of the user. In other versions of those implementations, the processor(s) may provide the automatic arrangement data to the third-party software application to enable the third-party software application to generate the modification selectable element. Accordingly, implementations described here are directed to improved techniques for quickly and efficiently modifying the automatic arranged transcription for the third-party software application as well.

By using techniques described herein, one or more technical advantages can be achieved. As one non-limiting example, the techniques described herein enable the automated assistant to more quickly and efficiently correct inadvertent automatic arrangements of transcriptions via a modification selectable element that corrects the inadvertent automatic arrangements of the transcriptions using single tap or two taps. As a result, a quantity of user inputs received at the client device is reduced and an overall duration of time required to properly format dictated transcriptions is reduced. Further, these techniques guide the human-to-computer interaction by providing a mechanism to quickly and efficiently correct the inadvertent automatic arrangements of the transcriptions, thereby reducing a duration of the human-to-computer interaction. Accordingly, the claimed techniques result in quick and efficient modification of the automatic arrangement of transcriptions in smart dictation The above description is provided as an overview of only some implementations of the present disclosure. Further description of those implementations, and other implementations, are described in more detail herein.

DETAILED DESCRIPTION

Figure 1:
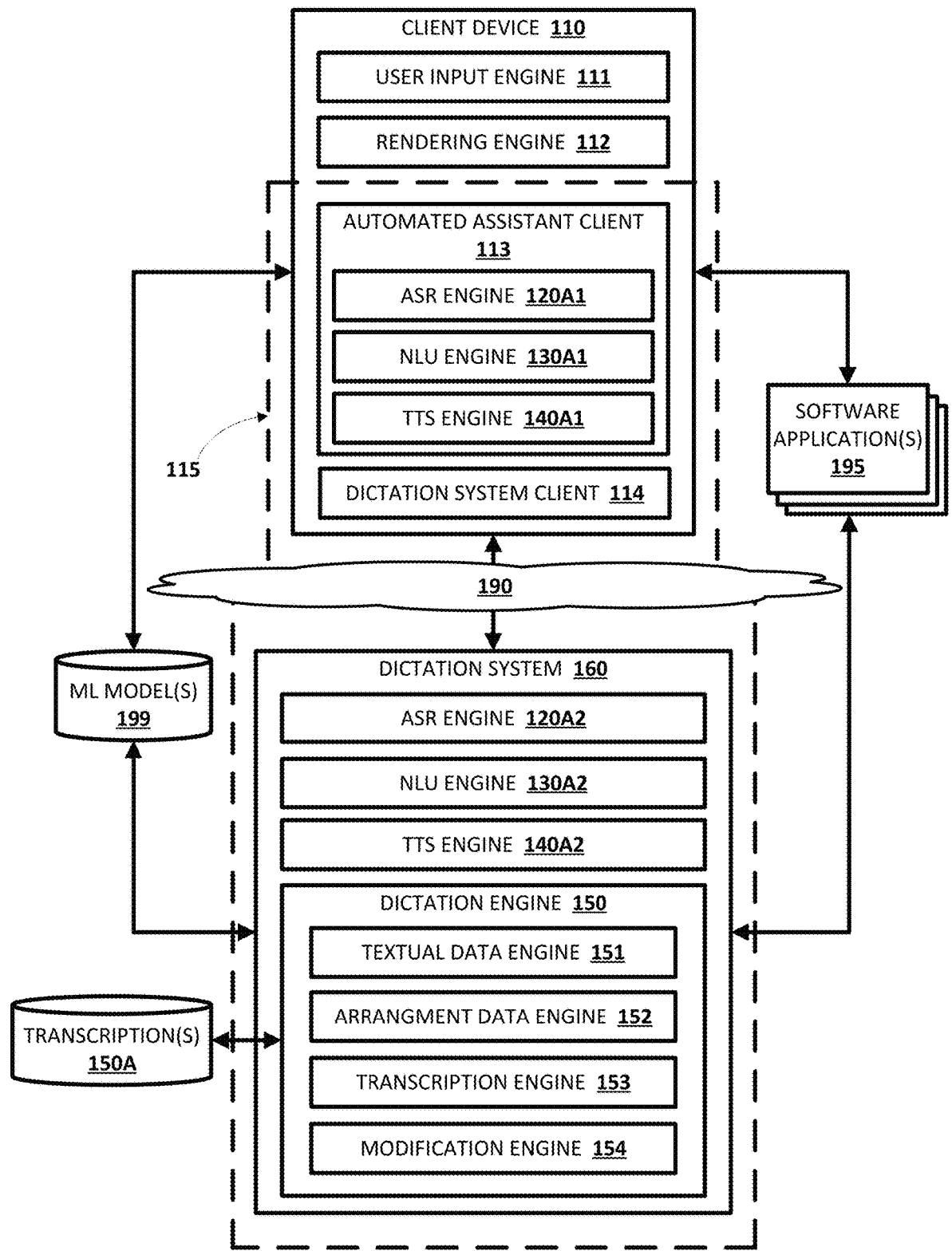
FIG. 1 is a block diagram of an example environment in which implementations disclosed herein may be implemented.

Turning to FIG. 1, a block diagram of an example environment that demonstrates various aspects of the present disclosure, and in which implementations disclosed herein can be implemented is depicted. The example environment includes a client device 110 and a dictation system 160. In some implementations, the dictation system 160 can be implemented locally at the client device 110. In additional or alternative implementations, the dictation system 160 can be implemented remotely from the client device 110 as depicted in FIG. 1. In these implementations, the client device 110 and the dictation system 160 may be communicatively coupled with each other via one or more networks 190, such as one or more wired or wireless local area networks ("LANs," including Wi-Fi®, mesh networks, Bluetooth®, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device, etc.). Additional and/or alternative client devices may be provided.

The client device 110 can execute an automated assistant client 113. An instance of the automated assistant client 113 can be an application that is separate from an operating system of the client device 110 (e.g., installed "on top" of the operating system)—or can alternatively be implemented directly by the operating system of the client device 110. The automated assistant client 113 can interact with the dictation system 160 locally at the client device 110 via a dictation system client 114 (e.g., an instance of the dictation system 160 that may be implemented locally at the client device 110) and/or remotely from the client device 110 via one or more of the networks 190 (e.g., as shown in FIG. 1). The automated assistant client 113 (and optionally by way of its interactions with the dictation system 160) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 113 of the client device 110 and the dictation system 160. It thus should be understood that a user that engages with the automated assistant client 113 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 113 executing on the client device 110 and/or remotely from the client device 110. Further, the dictation system 160 as used herein will refer to the dictation system client 114 executing at the client device 110 and/or remotely from the client device 110.

In various implementations, the client device 110 may include a user input engine 111 that is configured to detect user input provided by a user of the client device 110 using one or more user interface input devices. For example, the client device 110 may be equipped with one or more microphones that are configured to detect acoustic (or pressure) waves, such as spoken utterance(s) of the user, or other sounds in an environment of the client device 110, and to generate corresponding audio data that captures the spoken utterance(s) of the user. Additionally, or alternatively, the client device 110 may be equipped with one or more vision components that are configured to capture object(s) and/or movement(s) (e.g., gestures) detected in a fields of view of one or more of the vision components, and to generate corresponding vision data that captures the object(s) and/or movement(s). Additionally, or alternatively, the client device 110 may be equipped with one or more touch sensitive components (e.g., a keyboard and mouse, a stylus, a touch screen, a touch panel, one or more hardware buttons, etc.) that are configured to capture touch input directed to the client device 110, and to generate corresponding touch data that captures the touch input.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

Further, the client device 110 and/or the dictation system 160 may include one or more memories for storage of data and software applications 195, one or more processors for accessing data and executing the software applications 195, and other components that facilitate communication over one or more of the networks 190. In some implementations, one or more of the software applications 195 can be installed locally at the client device 110, whereas in other implementations one or more of the software applications 195 can be hosted remotely from the client device 110 (e.g., by one or more servers), but accessible by the client device 110 over one or more of the networks 190.

In some implementations, the operations performed by the automated assistant 115 may be implemented locally at the client device 110. As noted above, in various implementations, the client device 110 may operate the automated assistant client 113. As shown in FIG. 1, the automated assistant client 113 may include an automatic speech recognition (ASR) engine 120A1, a natural language understanding (NLU) engine 130A1, and a text-to-speech (TTS) engine 140A1. In some implementations, the operations performed by the automated assistant 115 may be distributed across multiple computer systems, such as when the dictation system 160 is implemented remotely from the client device 110 as depicted in FIG. 1. In these implementations, the automated assistant 115 may utilize ASR engine 120A2, NLU engine 130A2, and TTS engine 140A2 of the dictation system 160.

Each of these engines may be configured to perform one or more functions. For example, the ASR engine 120A1 and/or 120A2 can process, using ASR model(s) stored in machine learning (ML) model(s) database 199 (e.g., a streaming ASR model or other ASR model), audio data that captures spoken utterance(s) and that is generated by microphone(s) of the client device 110 to generate ASR output. Further, the NLU engine 130A1 and/or 130A2 can process, using NLU model(s) stored in the ML model(s) database 199, the ASR output to generate NLU output. Moreover, the TTS engine 140A1 and/or 140A2 can process, using TTS model(s) stored in the ML model(s) database 199, textual data (e.g., text formulated by the automated assistant 115) to generate synthesized speech audio data that includes computer-generated synthesized speech.

In various implementations, the ASR output can include, for example, one or more speech hypotheses that are predicted to correspond to the spoken utterance(s) of the user that is captured in the audio data, one or more corresponding predicted values (e.g., probabilities, log likelihoods, and/or other values) for each of the one or more speech hypotheses, a plurality of phonemes that are predicted to correspond to the spoken utterance(s) of the user that is captured in the audio data, and/or other ASR output. In some versions of those implementations, the ASR engine 120A1 and/or 120A2 can select one or more of the speech hypotheses as recognized text that corresponds to the spoken utterance(s) (e.g., based on the corresponding predicted values). The recognized text that corresponds to the spoken utterance(s) may be considered textual data corresponding to the spoken utterance(s).

In various implementations, the NLU output can include, for example, annotated recognized text that includes one or more annotations of the recognized text for one or more (e.g., all) of the terms of the textual data. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, contact entries of the user, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 can generate a transcription that is based on spoken utterance(s) provided by a user of the client device 110 and that is automatically arranged for the user and/or manually arranged by the user based on the spoken utterance(s). In implementations where the transcription is automatically arranged, the automated assistant 115 may generate a modification textual element that enables inadvertent automatic arrangements in the transcription to be quickly and efficiently modified through utilization of a dictation engine 150. In various implementations, the dictation engine 150 may include a textual data engine 151, an arrangement data engine 152, a transcription engine 153, and a modification engine 154 as depicted in FIG. 1.

Figure 2A:
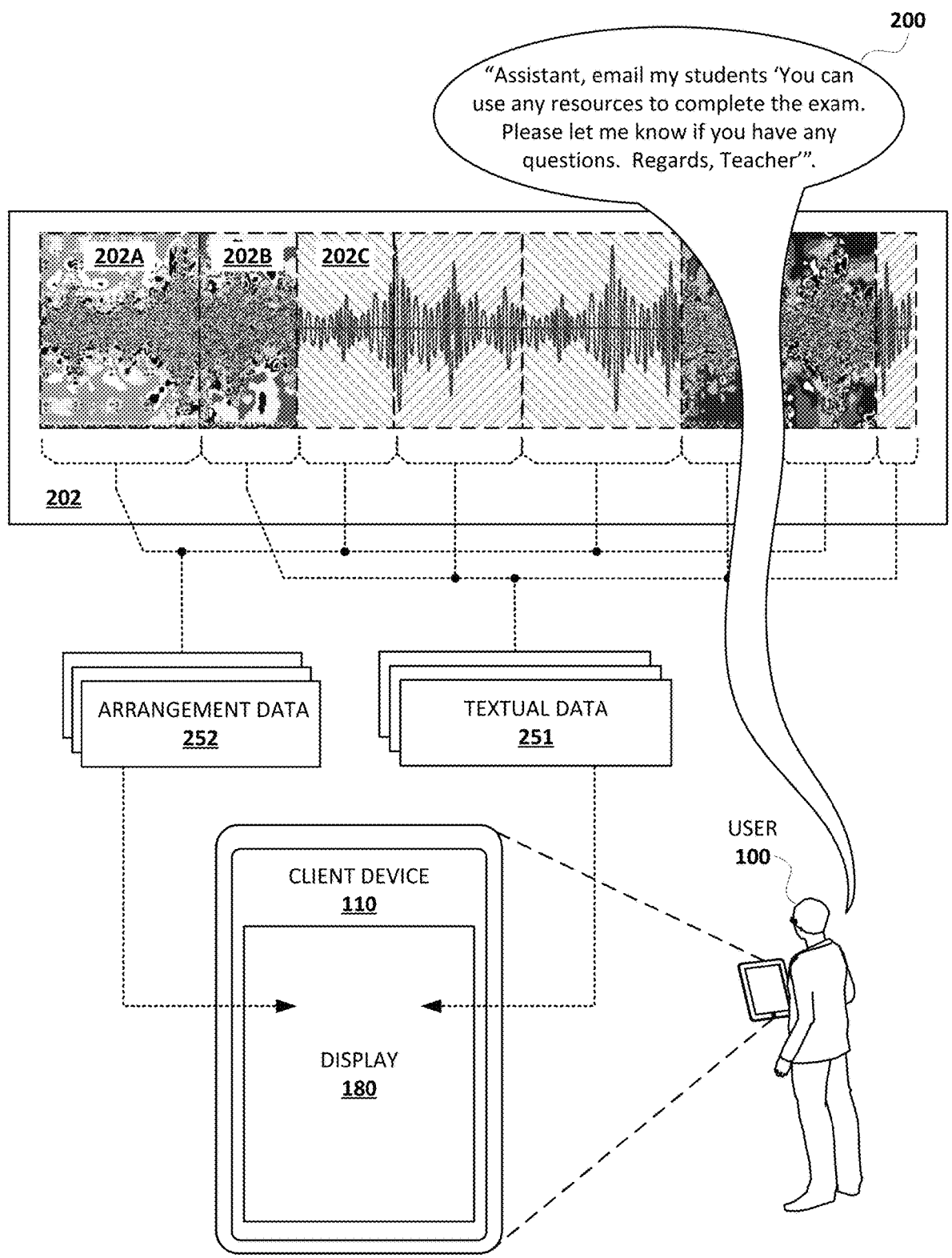
FIG. 2A, FIG. 2B, FIG. 2C, FIG. 2D, FIG. 2E, and FIG. 2F illustrate various non-limiting examples of automatically arranging textual data in a transcription and correcting inadvertent automatic arrangements in the transcription, in accordance with various implementations.

Turning now to FIGS. 2A-2F, various non-limiting examples of automatically arranging textual data in a transcription and correcting inadvertent automatic arrangements in the transcription. Referring specifically to FIG. 2A, assume that a user 100 of the client device 110 directs a spoken utterance 200 of "Assistant, email my students 'You can use any resources to complete the exam. Please let me know if you have any questions. Regards, Teacher" to the automated assistant 115 executing at least in part at the client device 110. The spoken utterance 200 may be captured in audio data 202 generated by microphone(s) of the client device 110. In various implementations, the audio data 202 may only be processed in response to determining that the audio data 202 invokes the automated assistant 115. For example, a first portion 202A of the audio data 202 may capture a particular word or phrase, such as "Assistant". The automated assistant 115 may process, using a hotword detection model (e.g., stored in the ML model(s) database 199), the first portion 202A of the audio data 202 to determine that the spoken utterance 200 provided by the user 100 is directed to the automated assistant 115 based on inclusion of the particular word or phrase in the spoken utterance. Although the particular word or phrase is described as being captured in the first portion 202A of the audio data 200, it should be understood that is for the sake of example and that the particular word or phrase may be captured in other portions of the audio data 202, such as those corresponding to the middle of the spoken utterance 200, the end of the spoken utterance 200. As another example, the user 100 may tap a button (e.g., hardware button or software button) that invokes the automated assistant 115. As yet another example the user may direct a gaze at the client device 110 (e.g., captured in vision data generated by vision component(s) of the client device 110), and optionally along with mouth movement, lip movement, head movement, etc. (e.g., also captured in vision data generated by vision component(s) of the client device 110), to invoke the automated assistant 115.

In various implementations, the audio data 202 may be processed to determine an intent of the user 100 in providing the spoken utterance 200. For example, the first portion 202A of the audio data 202 may also capture a request or command that is directed to the automated assistant 115. The automated assistant 115 may cause the ASR engine 120A1 and/or 120A2 and/or the NLU engine 130A1 and/or 130A2 to process, using an ASR model and/or NLU model (e.g., stored in the ML model(s) database 199), the first portion 202A of the audio data 202 to identify a command of "email my students". The command of "email my students" may include an intent of "email" that may cause an email application that is accessible at the client device 110 to be launched, and a slot value of "students" for a "to" field parameter for the "email" intent. Accordingly, the automated assistant 115 may cause the email application to be launched to a state that includes a draft email addressed to the "students" of the user 100, which may be provided for presentation to the user 100 of the client device via a display 180 of the client device 110. Although the first portion 202A of the audio data is described as capturing both the hotword (e.g., "Assistant") and the command (e.g., "email my students"), it should be understood that is for the sake of example and is not meant to be limiting. Rather, it should be understood that the hotword and command may be captured in one or more multiple disparate portions of the audio data 202.

Further, any subsequent portions of the spoken utterance 200 that are captured in the audio data 202 may be incorporated into a transcription corresponding to the draft email as part of a dictation session between the user 100 and the automated assistant 115 that utilizes the dictation engine 150. The transcription may be generated based on textual data generated based on processing the audio data 202 that captures the spoken utterance 200. In some implementations, the transcription may be arranged according to a manual arrangement specified by the user 100 (e.g., by the user actually saying "period" after saying "exam" in the spoken utterance 200), whereas in other implementations, the transcription may be automatically arranged when no manual arrangement is specified by the user 100.

Figure 2B:
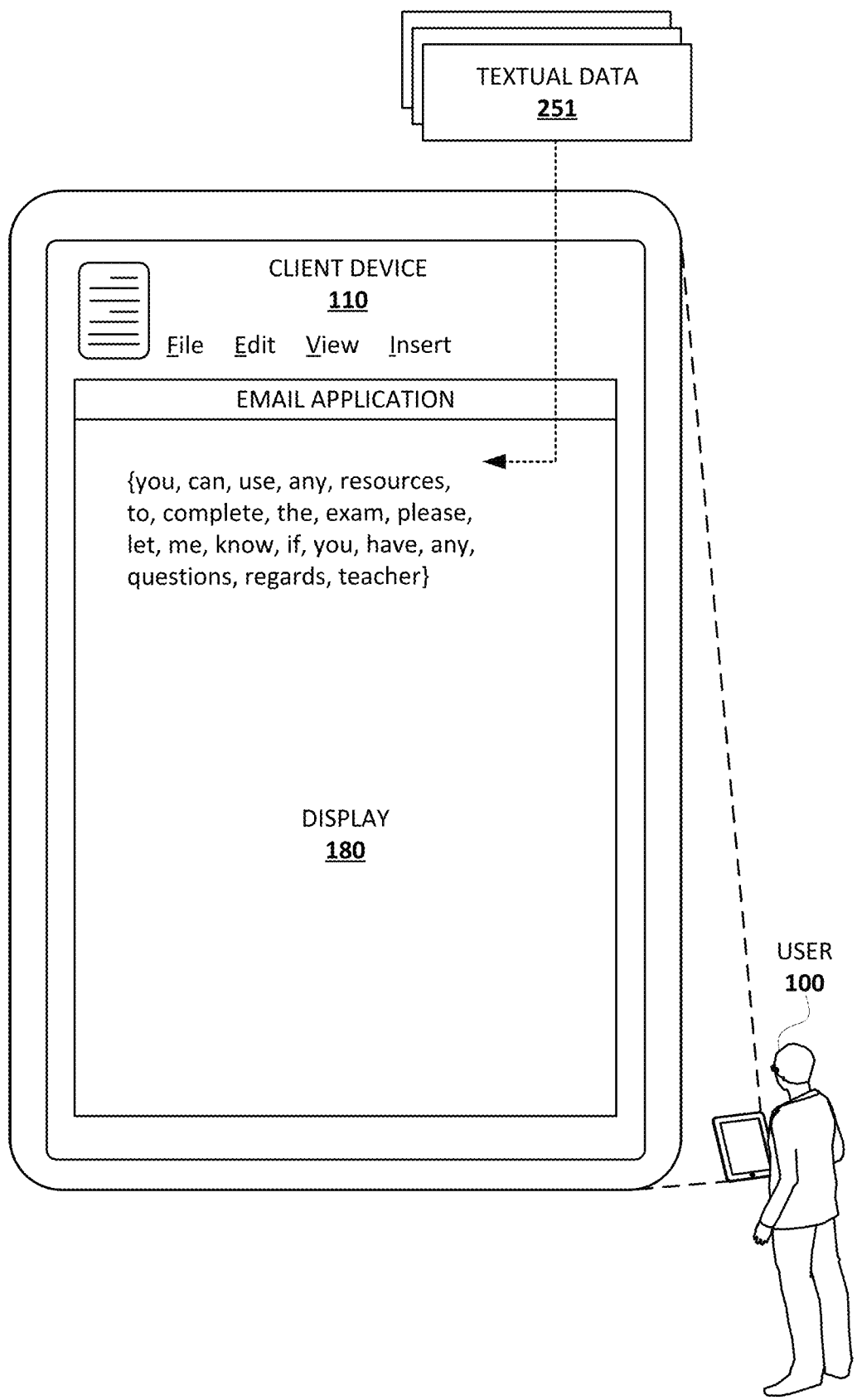

Continuing with the above example, assume that a second portion 202B of the audio data 202 captures "You can use any resources to complete the exam" from the spoken utterance 200, and assume that a third portion 202C of the audio data 202 captures "Please let me know if you have any questions. Regards, Teacher". The textual data engine 151 may generate textual data 251 corresponding to the spoken utterance 200 by causing the ASR engine 120A1 and/or 120A2 to process, using the ASR model, the second portion 202B and the third portion 202C of the audio data 202. Referring specifically to FIG. 2B, the textual data 251 may include recognized text corresponding to terms and/or phrases captured in the second portion 202B and third portion 202C of the audio data 202. Although the terms and/or phrases included in the textual data 251 are illustrated as being provided for presentation to the user 100 at the display 180 of the client device 110 depicted in FIG. 2B, it should be understood that this is for the sake of illustration. Moreover, although the textual data 251 depicted in FIG. 2B only includes terms and/or phrases without punctuation, it should be understood that is for the sake of example and is not meant to be limiting. For instance, some ASR models are capable of generating textual data that includes punctuation.

Figure 2C:
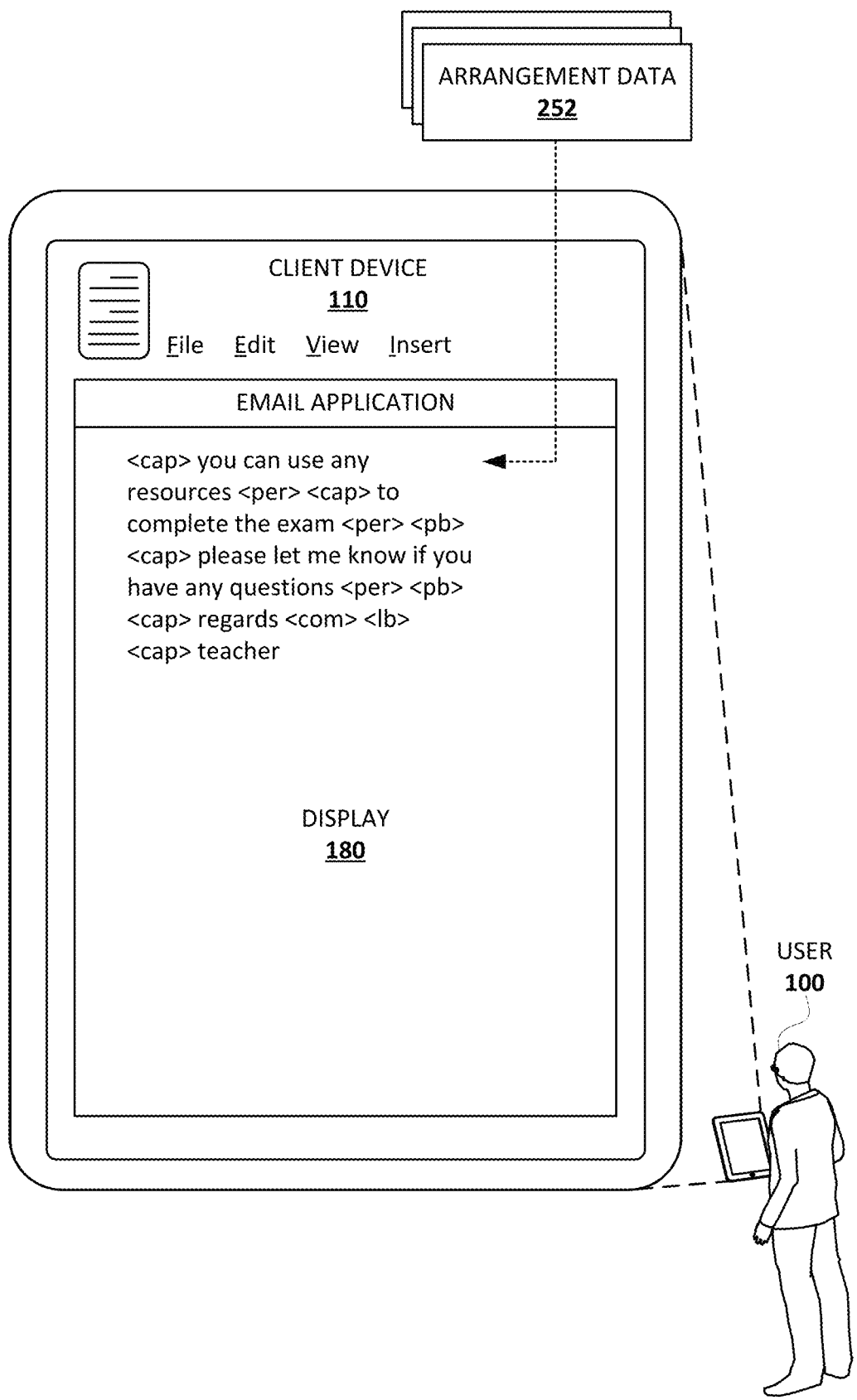

Further, the arrangement data engine 152 may generate arrangement data 252 for automatically arranging the textual data 251 in the transcription for the draft email. In implementations where the manual arrangement is specified by the user 100, the arrangement data 252 may include data that captures the manual arrangement specified by the user 100. However, in implementations where no manual arrangement is specified by the user 100, the arrangement data 252 may generate data that specifies an automatic arrangement for the textual data 251. Referring specifically to FIG. 2C, the arrangement data 252 may include various arrangement operations for automatically arranging the textual content, such as an arrangement operation of <cap> to indicate the following letter should be capitalized, <per> to indicate that a period should be inserted, <pb> to indicate that a paragraph break should be inserted, <com> to indicate that a comma should be inserted, <lb> to indicate that a line break should be inserted, and/or other arrangement operations for automatically arranging the textual data 251. Although the arrangement operations included in the arrangement data 252 are depicted with respect to the textual data 251 are illustrated as being provided for presentation to the user 100 at the display 180 of the client device 110 depicted in FIG.

2C, it should be understood that is for the sake of illustration. Moreover, although the arrangement operations included in the arrangement data 252 depicted in FIG. 2C particular arrangement operations, it should be understood that is for the sake of example and is not meant to be limiting.

For instance, in implementations where no manual arrangement is specified by the user 100, the arrangement data engine 152 may cause the textual data 251, the second portion 202B of the audio data 202, and/or the third portion 202C of the audio data 202 to be processed, using automatic arrangement ML model(s) (e.g., stored in the ML model(s) database 199), to generate the arrangement data 252. The automatic arrangement ML model(s) may include any ML models that may be utilized to automatically arrange the textual data 251 in the transcription. The automatic arrangement ML model(s) utilized by the arrangement data engine 152 to automatically arrange the transcription may be based on a type of the transcription to be dictated. For instance, if the transcription to be dictated corresponds to an email, then the arrangement data engine 152 may utilize a first set of arrangement ML model(s) to automatically arrange the transcription. In contrast, if the transcription to be dictated corresponds to a text message, then the arrangement data engine 152 may utilize a second set of arrangement ML model(s) to automatically arrange the transcription that includes and/or omits at least one arrangement ML model when compared to the first set of arrangement ML model(s) (e.g., a paragraph break ML model may not be utilized in generating a transcription for a text message since text messages are typically of a shorter length than emails and user typically do not include paragraph breaks in text messages).

Continuing with the above example, the automatic arrangement ML model(s) may include an automatic punctuation ML model that is trained to identify, for inclusion in the arrangement data 252, automatic punctuation marks for the transcription, such as the <per> after "resources", the <per> after "exam", the "per" after "questions", and the <com> after "regards"; an automatic capitalization ML model to identify, for inclusion in the arrangement data 252, automatic capitalizations for the transcription, such as the <cap> to capitalize the "y" in "you", the <cap> to capitalize the "t" in "to", the <cap> to capitalize the "p" in "please", the <cap> to capitalize the "r" in "regards", and the <cap> to capitalize the "t" in "teacher"; an automatic paragraph break ML model that is trained to identify, for inclusion in the arrangement data 252, automatic paragraph breaks for the transcription, such as the <pb> after the <per> following "exam" and the <pb> after the <per> following "questions; an automatic line break ML model that is trained to identify, for inclusion in the automatic arrangement data, automatic line breaks for the transcription, such as the <lb> following the <com> after "regards"; and/or any other ML models that may be utilized in generating the automatic arrangement data for the instance, the transcription may be automatically arranged according to the automatic arrangement data. Notably, in some implementations, these automatic arrangement ML model(s) may be stored locally in on-device storage of the client device 110 (e.g., the ML model(s) database 199 may be local to the client device 110), whereas in other implementations, these automatic arrangement ML model(s) may be stored remotely from the client device 110 (e.g., at the dictation system 160).

Figure 2D:
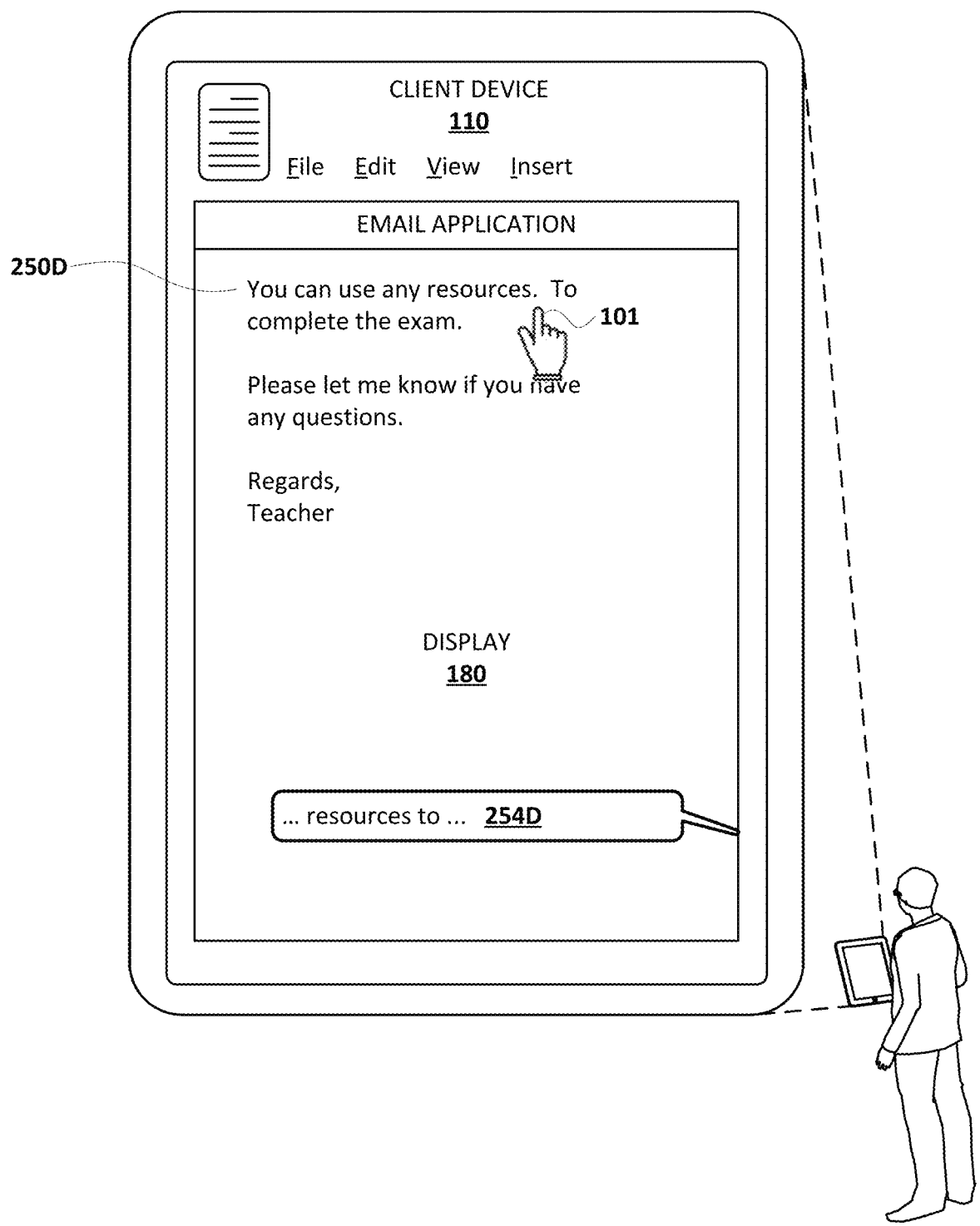

Referring specifically to FIG. 2D, the transcription engine 153 may generate a transcription 250D based on the textual data 251 from FIG. 2B and the arrangement data 252 from FIG. 2C is depicted. However, assume that, in providing the spoken utterance 200, the user 100 did not intend for the transcription 250D to include the <per> after "resources", the <cap> for the "t" in "to", or the <pb> after the <per> following "exam" as illustrated in the transcription 250D. Nonetheless, the modification engine 154 may generate one or more modification selectable elements for the transcription 250D based on the transcription 250D being automatically arranged. In particular, the modification engine 154 may generate one or more modification selectable elements that when selected, cause the textual data 251 and/or the arrangement operations included in the arrangement data 252 to be modified, thereby modifying the transcription 250D.

Continuing with the above example, further assume that the textual data 251 and/or the arrangement operations included in the arrangement data 252 is stored in one or more databases accessible by the client device (e.g., in transcription(s) database 150A). The modification engine 154 may access the textual data 251 and/or the arrangement operations included in the arrangement data 252 to generate the one or more modification selectable elements for the transcription 250D. For instance, for each of the arrangement operations that were performed to automatically arrange the transcription 250D, the modification engine 154 may generate a corresponding modification selectable element that causes one or more corresponding arrangement operations to be undone.

As one non-limiting example, the modification engine 154 may generate a first modification selectable element 254D based on the <per> after "resources" and the <cap> for the "t" in "to" being automatically arranged in the transcription 250D such that, when the first modification selectable element 254D is selected by the user 100, the <per> after "resources" may be removed and the <cap> for the "t" in "to" may be changed to a <decap> that indicates the "t" in "to" should be decapitalized. The first modification selectable element 254D may optionally include a preview of the modification to be made to the transcription 250D as shown in FIG. 2D. In this example, the first modification selectable element 254D may be provided for presentation to the user 100 via the display 180 in response to receiving touch input (e.g., as generally indicated by 101 in FIG. 2D) directed to the word "resources", the <per> after "resources", and/or the word "to". Accordingly, when the user 100 selects the first modification selectable element 254D, the transcription 250D may be modified to remove the <per> after "resources" and to decapitalize the "t" in "to" as shown in a modified transcription 250E in FIG. 2E. Notably, in this example, the "t" in "to" may not be decapitalized if "to" was another word that corresponded to a word that intrinsically capitalized (e.g., as indicated by data stored in the transcription(s) database 150A).

Figure 2E:
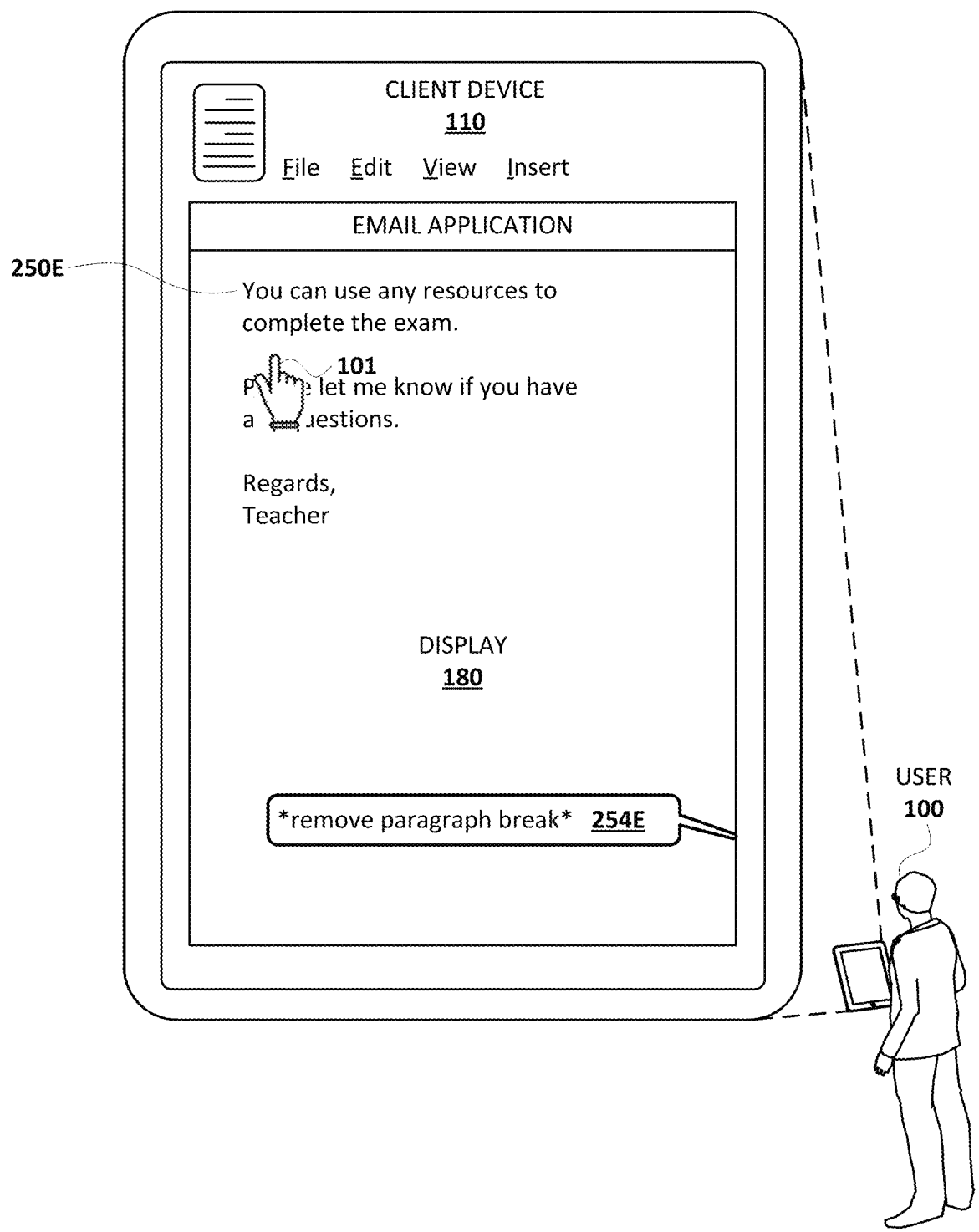
Figure 2F:
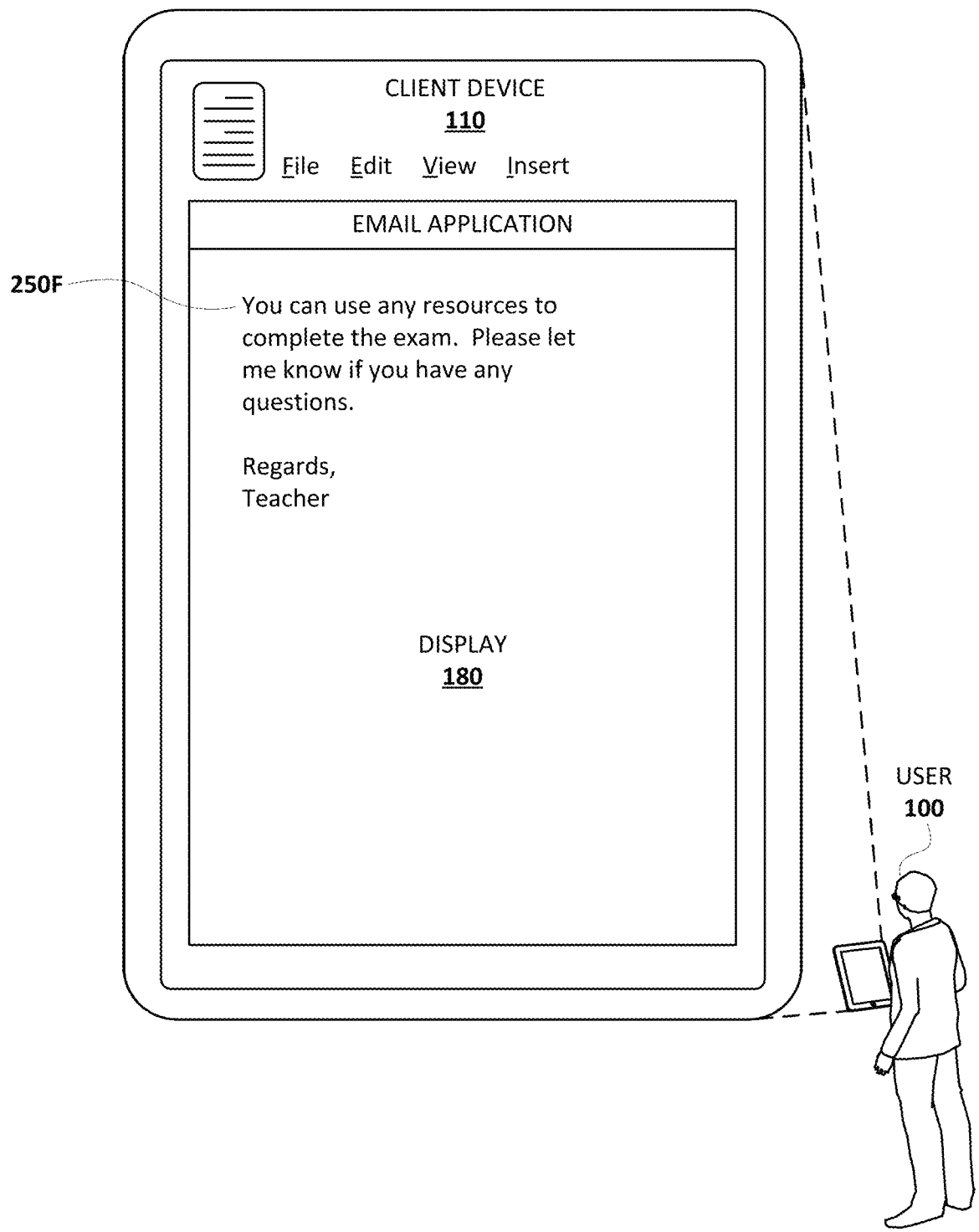

As another non-limiting example, and referring specifically to FIG. 2E, the modification engine 154 may generate a second modification selectable element 254E based on the <pb> after "exam" being automatically arranged in the transcription 250D (and the modified transcription 250E) such that, when the second modification selectable element 254E is selected by the user 100, the <pb> after "exam" may be removed. The second modification selectable element 254E may optionally include a preview of the modification to be made to the modified transcription 250E as shown in FIG. 2E. In this example, the second modification selectable element 254E may be provided for presentation to the user 100 via the display 180 in response to receiving touch input (e.g., as generally indicated by 101 in FIG. 2E) directed to the space occupied by the paragraph break. Accordingly, when the user 100 selects the second modification selectable element 254E, the modified transcription 250E may be further modified to remove the <pb> after "exam" as shown in a further modified transcription 250F in FIG. 2F that reflects textual data arranged in a transcription as the user 100 originally intended in providing the spoken utterance 200.

Accordingly, techniques described herein enable the transcription 250D that is automatically arranged to be quickly and efficiently modified through utilization of modification selectable elements. Although the example described with respect to FIGS. 2A-2F describe particular arrangement operations, particular modification selectable elements, and particular locations to direct the touch input to cause the particular modification selectable elements, it should be understood that is for the sake of example and is not meant to be limiting. Rather, it should be understood that the arrangement operations, modification selectable elements, and the touch inputs described above may be a function of spoken utterances provided by the user and how the automated assistant 115 determines how to arrange textual data corresponding to the spoken utterances.

Figure 3:
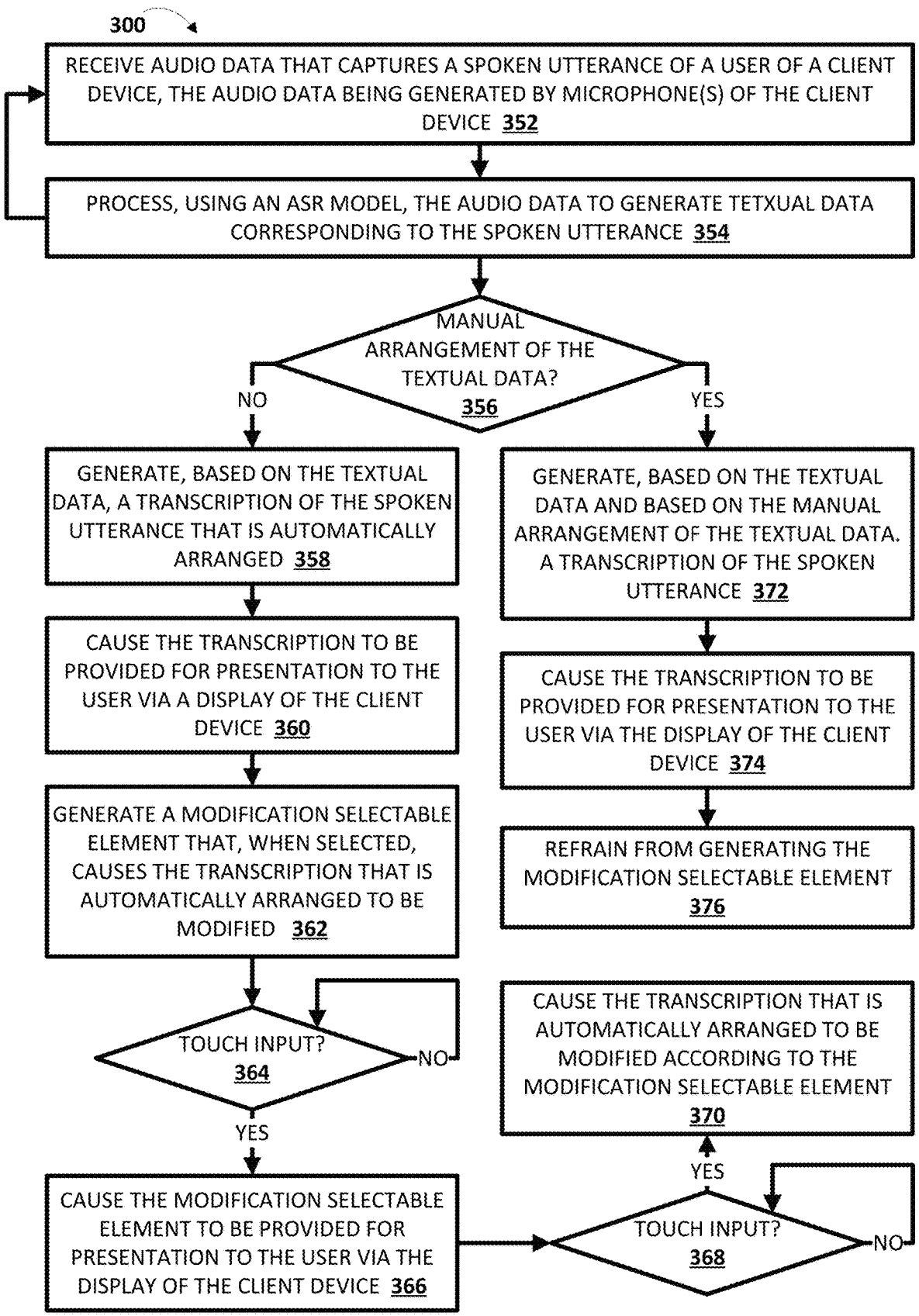
FIG. 3 is a flowchart illustrating an example method of automatically arranging textual data in a transcription and correcting inadvertent automatic arrangements in the transcription, in accordance with various implementations.

Turning now to FIG. 3, a flowchart illustrating an example method 300 of automatically arranging textual data in a transcription and correcting inadvertent automatic arrangements in the transcription is depicted. For convenience, the operations of the method 300 are described with reference to a system that performs the operations. This system of the method 300 includes one or more processors, memory, and/or other component(s) of computing device(s) (e.g., the client device 110 of FIGS. 1 and 2A-2F, computing device 510 of FIG. 5, one or more servers, and/or other computing devices). Moreover, while operations of the method 300 are shown in a particular order, this is not meant to be limiting. One or more operations may be reordered, omitted, and/or added.

At block 352, the system receives audio data that captures a spoken utterance of a user of a client device, the audio data being generated by one or more microphones of the client device. At block 354, the system processes, using an ASR model, the audio data to generate textual data corresponding to the spoken utterance. The system may return to the operations of block 352 to receive additional audio data that captures an additional spoken utterance of the user. Put another way, the system may engage in a dictation session with the user by enabling the user to continue providing spoken utterances. In turn, the system may continue processing audio data that captures the spoken utterances while simultaneously proceeding to the operations of block 356 according to the method 300 of FIG. 3. Accordingly, it should be understood that multiple iterations of the method 300 of FIG. 3 may be performed in a parallel manner based on the spoken utterances that are provided by the user during the dictation session.

At block 356, the system determines whether the user specified a manual arrangement of the textual data in the spoken utterance. For example, the system may determine whether the user specified "period", "comma", "capitalize", "new paragraph", "indent", and/or any other commands for the manual arrangement of the textual data in the spoken utterance. If, at an iteration of block 356, the system determines that the user did not specify the manual arrangement of the textual data in the spoken utterance, the system may proceed to the operations of block 358.

At block 358, the system generates, based on the textual data, a transcription of the spoken utterance that is automatically arranged. At block 360, the system causes the transcription to be provided for presentation to the user via a display of the client device. For example, the system may not only generate the transcription based on the textual data corresponding to the spoken utterance, but the system may also automatically arrange the textual data corresponding to the spoken utterance based on arrangement data generated by the system. The system may process, using various automatic arrangement ML models, the audio data that captures the spoken utterance and/or the textual data corresponding to the spoken utterance to generate the arrangement data (e.g., as described with respect to FIGS. 1 and 2A-2F). Further, the system may cause the transcription to be provided for presentation to the user via the display of the client device and optionally in a streaming manner (e.g., as the user continues to provide the spoken utterance and/or additional spoken utterances).

At block 362, the system generates a modification selectable element that, when selected, causes the transcription that is automatically arranged to be modified. The modification selectable element may be specific to one or more given arrangement operations utilized in automatically arranging the transcription (e.g., as described with respect to FIGS. 1 and 2A-2F).

At block 364, the system determines whether touch input that is directed to the transcription is received. In particular, the system may determine whether touch input is received that is directed to a portion of the transcription that is automatically arranged. If, at an iteration of block 364, the system determines that no touch input directed to the transcription is received, then the system may continue monitoring for the touch input at the iteration of block 364. Notably, the system may continue monitoring for the touch input that is directed to a portion of the transcription that is automatically arranged for a duration of a dictation system between the user and the system.

If, at an iteration of block 364, the system determines that touch input directed to the transcription is received, then the system may proceed to the operations of block 366. At block 366, the system causes the modification selectable element to be provided for presentation to the user via the display of the client device. For example, the modification selectable element may be provided for presentation to the user in a manner that the modification selectable element overlays a portion of the transcription. Also, for example, the modification selectable element may be provided for presentation to the user in a manner that the modification selectable element is provided at a distinct portion of the display. In some implementations, the modification selectable element may include a preview of a modification to the transcription that will be made in response to a selection of the modification selectable element. In other implementations, the modification selectable element may include an indication of arrangement operations that may be performed in response to a selection of the modification selectable element (e.g., "select this to remove the paragraph break").

At block 368, the system determines whether touch input that is directed to the modification selectable element is received. If, at an iteration of block 368, the system determines that no touch input directed to the modification selectable element is received, then the system may continue monitoring for the touch input at the iteration of block 368. In various implementations, touch input directed to the display that is not a selection of the modification selectable element may cause the modification selectable element to be dismissed from the display of the client device. In these implementations, the method 300 of FIG. 3 may return to the operations of block 364 to allow the user to cause the modification selectable element to be provided for presentation to the user based on the touch input described above with respect to the operations of block 364.

If, at an iteration of block 368, the system determines that touch input directed to the modification selectable element is received, then the system may proceed to the operations of block 370. At block 370, the system causes the transcription that is automatically arranged to be modified according to the modification selectable element. The modifications to the transcription may be based on the textual data and/or arrangement operations that are associated with the modification selectable element (e.g., as described with respect to FIGS. 1 and 2A-2F). Accordingly, in implementations where the system automatically arranges the transcription for the user, the system may also provide a mechanism (e.g., modification selectable element(s)) that enables the user to quickly and efficiently modify the automatically arranged transcription.

If, at an iteration of block 356, the system determines that the user did specify the manual arrangement of the textual data in the spoken utterance, the system may proceed to the operations of block 372. At block 372, the system generates, based on the textual data and based on the manual arrangement of textual data, a transcription of the spoken utterance. At block 374, the system causes the transcription to be provided for presentation to the user via the display of the client device. For example, the system may not only generate the transcription based on the textual data corresponding to the spoken utterance, but the system may also arrange the textual data corresponding to the spoken utterance based on the manual arrangement of the textual data specified by the user in the spoken utterance. Further, the system may cause the transcription to be provided for presentation to the user via the display of the client device and optionally in a streaming manner (e.g., as the user continues to provide the spoken utterance and/or additional spoken utterances).

At block 376, the system refrains from generating the modification selectable element. Put another way, the system may only generate the modification selectable element for portions of the transcription that are automatically arranged and refrain from generating the modification selectable element for portions of the transcription for which the user specifies the arrangement. In various implementations, the transcription may include portions that are automatically arranged and portions that are manually arranged as specified for the user. In these implementations, the portions of the transcription that are automatically arranged may be associated with corresponding modification selectable elements, but the portions of the transcription that are manually arranged as specified for the user may not be associated with any modification selectable elements.

Figure 4:
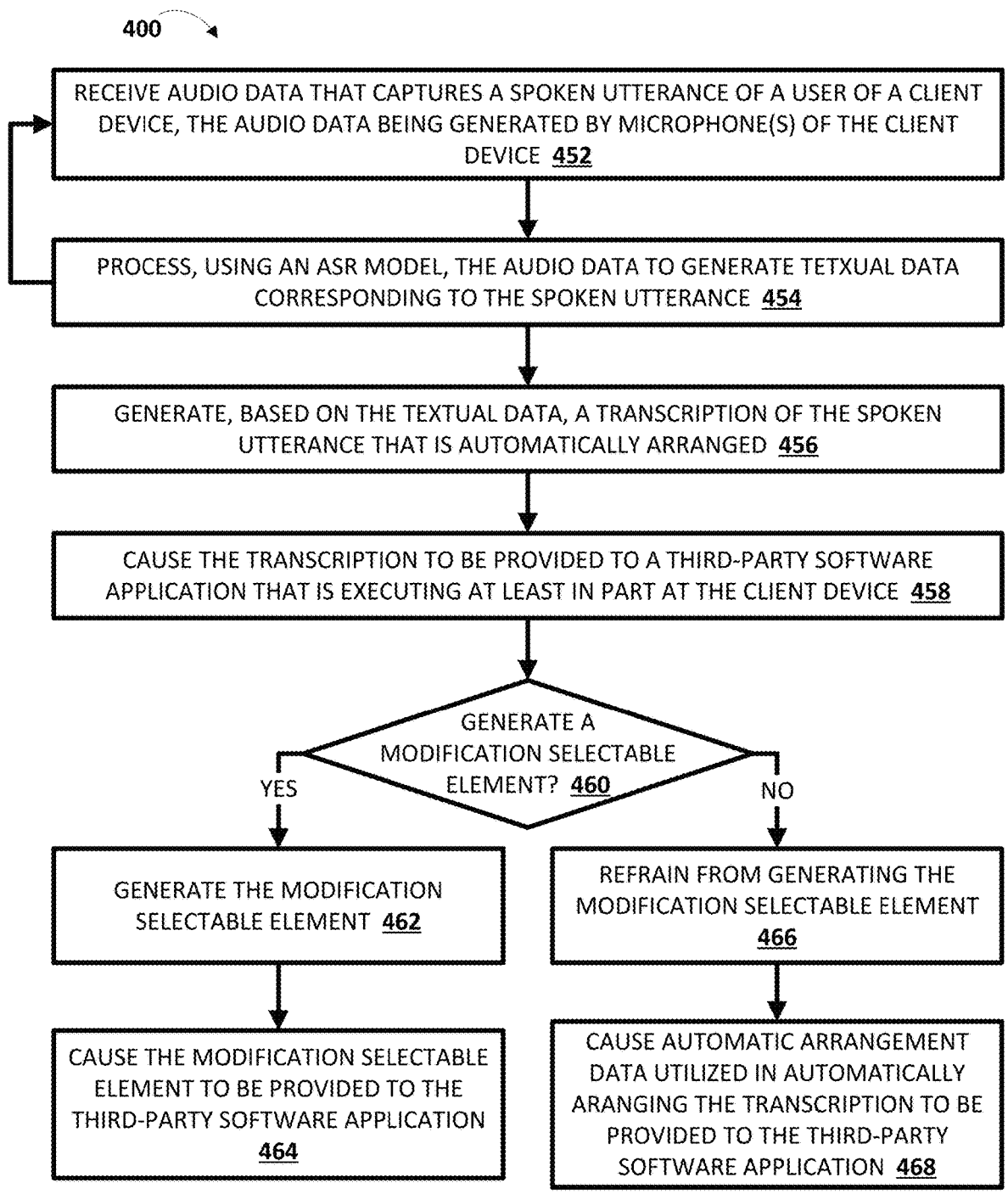
FIG. 4 is a flowchart illustrating an example method of providing automatic arrangement of textual data in a transcription and correction of inadvertent automatic arrangements in the transcription as a service to a third-party software application, in accordance with various implementations.

Turning now to FIG. 4, a flowchart illustrating an example method 400 of providing automatic arrangement of textual data in a transcription and correction of inadvertent automatic arrangements in the transcription as a service to a third-party software application is depicted. For convenience, the operations of the method 400 are described with reference to a system that performs the operations. This system of the method 400 includes one or more processors, memory, and/or other component(s) of computing device(s) (e.g., the client device 110 of FIGS. 1 and 2A-2F, computing device 510 of FIG. 5, one or more servers, and/or other computing devices). Moreover, while operations of the method 400 are shown in a particular order, this is not meant to be limiting. One or more operations may be reordered, omitted, and/or added.

At block 452, the system receives audio data that captures a spoken utterance of a user of a client device, the audio data being generated by one or more microphones of the client device. At block 454, the system processes, using an ASR model, the audio data to generate textual data corresponding to the spoken utterance. The system may return to the operations of block 452 to receive additional audio data that captures an additional spoken utterance of the user. Put another way, the system may engage in a dictation session with the user by enabling the user to continue providing spoken utterances. In turn, the system may continue processing audio data that captures the spoken utterances while simultaneously proceeding to the operations of block 456 according to the method 400 of FIG. 4. Accordingly, it should also be understood that multiple iterations of the method 400 of FIG. 4 may be performed in a parallel manner based on the spoken utterances that are provided by the user during the dictation session.

At block 456, the system generates, based on the textual data, a transcription of the spoken utterance that is automatically arranged. At block 458, the system causes the transcription to be provided to a third-party software application that is executing at least in part at the client device. The third-party software application may cause the transcription to be provided for presentation to the user via a display of the client device. Put another way, in the method 400 of FIG. 4, the system may be utilized as a service by various third-party software applications executing at least in part at the client device of the user (e.g., one or more of software application(s) 195 of FIG. 1). For example, the third-party software application may be a third-party keyboard application. In this example, the third-party software application may not support dictation. Accordingly, the system may enable the third-party software application to support dictation by providing the method 400 of FIG. 4 as a service to the third-party keyboard application.

At block 460, the system determines whether to generate a modification selectable element that, when selected, causes the transcription that is automatically arranged to be modified. The system may determine whether to generate the modification selectable element based on, for example, whether the third-party software application has requested that the system generate the modification selectable element. If, at an iteration of block 460, the system determines to generate the modification selectable element, then the system may proceed to the operations of block 462. At block 462, the system generates the modification selectable element. At block 464, the system causes the modification selectable element to be provided to the third-party software application. For example, not only may the system provide the transcription as a service to the third-party software application, but the system may also provide the modification of the transcription as a service to the third-party application by providing the modification selectable element to the third-party software application.

If, at an iteration of block 460, the system determines not to generate the modification selectable element, then the system may proceed to the operations of block 466. At block 466, the system refrains from generating the modification selectable element. At block 468, the system causes automatic arrangement data utilized in automatically arranging the transcription to be provided to the third-party software application. For example, rather than generating the modification selectable element for the third-party software application, the system may simply provide the data to the third-party software application to enable the third-party software application to generate modification selectable elements.

Figure 5:
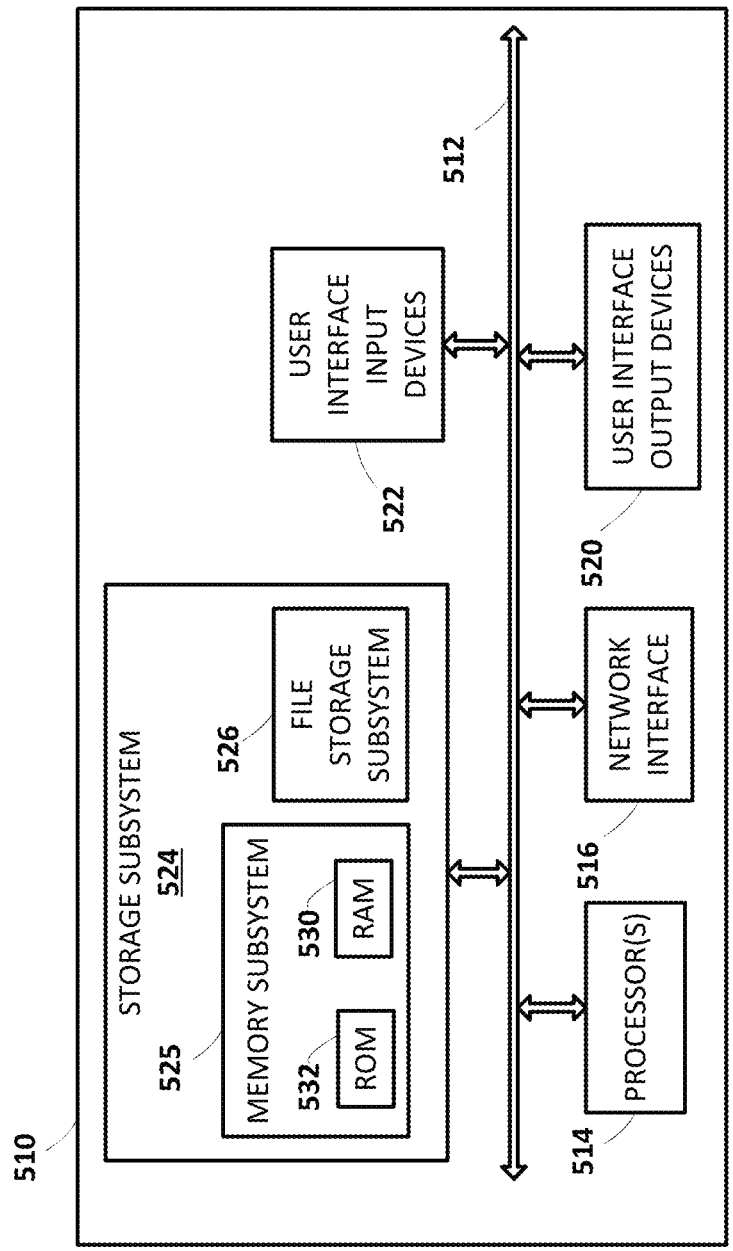
FIG. 5 illustrates an example architecture of a computing device, in accordance with various implementations.

Turning now to FIG. 5, a block diagram of an example computing device 510 that may optionally be utilized to perform one or more aspects of techniques described herein is depicted. In some implementations, one or more of the client device 110, the dictation system 160, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods described herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data corresponding to the spoken utterance; generating, based on the textual data corresponding to the spoken utterance, a transcription of the spoken utterance that is automatically arranged, the transcription that is automatically arranged including at least an automatic punctuation mark following a given term that is included in the textual data and an automatic capitalization of a subsequent term that is included in the textual data and that is subsequent to the given term; causing the transcription to be provided for presentation to the user via a display of the client device; generating a modification selectable element that, when selected by the user, causes the transcription that is automatically arranged to be modified to remove the automatic punctuation mark and/or the automatic capitalization; receiving touch input from the user via the display of the client device, the touch input being directed to the transcription of the spoken utterance; and in response to receiving the touch input from the user that is directed to the transcription of the spoken utterance and based on the transcription of the spoken utterance being generated based on the transcription being automatically arranged: causing the modification selectable element to be provided for presentation to the user via the display of the client device.

These and other implementations of the technology disclosed herein can include one or more of the following features.

In some implementations, the method further includes receiving additional touch input from the user via the display of the client device, the additional touch input being directed to the modification selectable element; and in response to receiving the additional touch input from the user that is directed to the modification selectable element: causing the transcription that is automatically arranged to be modified to remove the automatic punctuation mark and/or the automatic capitalization.

In some versions of those implementations, causing the transcription that is automatically arranged to be modified to remove the automatic punctuation mark and/or the automatic capitalization may include causing the automatic punctuation mark following the given term that is included in the textual data to be removed; and causing the automatic capitalization of the subsequent term that is included in the textual data and that is subsequent to the given term to be removed.

In some further versions of those implementations, causing the automatic capitalization of the subsequent term that is included in the textual data and that is subsequent to the given term to be removed may include supplanting an automatically capitalized first letter of the subsequent term that is included in the textual data and that is subsequent to the given term with a corresponding lowercased first letter of the subsequent term.

In additional or alternative versions of those implementations, causing the transcription that is automatically arranged to be modified to remove the automatic punctuation mark and/or the automatic capitalization may include causing the automatic punctuation mark following the given term that is included in the textual data to be removed; and refraining from causing the automatic capitalization of the subsequent term that is included in the textual data and that is subsequent to the given term to be removed.

In some further versions of those implementations, refraining from causing the automatic capitalization of the subsequent term that is included in the textual data and that is subsequent to the given term to be removed may include determining whether the automatic capitalization of the subsequent term that is included in the textual data and that is subsequent to the given term is an intrinsic capitalization; and in response to determining that the automatic capitalization of the subsequent term that is included in the textual data and that is subsequent to the given term is the intrinsic capitalization: refraining from causing the automatic capitalization of the subsequent term that is included in the textual data and that is subsequent to the given term to be removed.

In yet further versions of those implementations, the intrinsic capitalization may be an entity reference to an entity.

In additional or alternative versions of those implementations, the modification selectable element may include a preview of a portion of a modified transcription that is modified to remove the automatic punctuation mark and/or the automatic capitalization.

In some implementations, the spoken utterance may not explicitly include the automatic punctuation mark following the given term that is included in the transcription, and the spoken utterance may not explicitly include the automatic capitalization of the subsequent term that is included in the transcription and that is subsequent to the given term.

In some implementations, the touch input that is directed to the transcription of the spoken utterance may be directed to the automatic punctuation mark following the given term that is included in the textual data. In additional or alternative implementations, the touch input that is directed to the transcription of the spoken utterance may be directed to the given term. In additional or alternative implementations, the touch input that is directed to the transcription of the spoken utterance may be directed to the subsequent term that is included in the textual data and that is subsequent to the given term.

In some implementations, the one or more processors may be local to the client device of the user.

In some implementations, the method may further include processing, using one or more automatic arrangement machine learning (ML) models, the audio data that captures the spoken utterance and/or the textual data corresponding to the spoken utterance to generate automatic arrangement data for automatically arranging the transcription.

In some versions of those implementations, the one or more automatic arrangement ML models may include an automatic punctuation ML model, and processing the audio data that captures the spoken utterance and/or the textual data corresponding to the spoken utterance to generate the automatic arrangement data for automatically arranging the transcription using the one or more automatic arrangement ML models may include processing, using the automatic punctuation ML model, the audio data that captures the spoken utterance and/or the textual data corresponding to the spoken utterance to identify the automatic punctuation mark following the given term that is included in the textual data.

In additional or alternative versions of those implementations, the one or more automatic arrangement ML models may include an automatic capitalization ML model, and processing the audio data that captures the spoken utterance and/or the textual data corresponding to the spoken utterance to generate the automatic arrangement data for automatically arranging the transcription using the one or more automatic arrangement ML models may include processing, using the automatic capitalization ML model, the audio data that captures the spoken utterance and/or the textual data corresponding to the spoken utterance to identify the automatic capitalization of the subsequent term that is included in the textual data and that is subsequent to the given term.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data corresponding to the spoken utterance; determining, based on the audio data that captures the spoken utterance and/or based on the textual data corresponding to the spoken utterance, whether the user has specified an arrangement of the textual data for a transcription of the spoken utterance; and in response to determining that the user has not specified the arrangement of the textual data for the transcription: generating, based on the textual data corresponding to the spoken utterance, the transcription of the spoken utterance that is automatically arranged; causing the transcription to be provided for presentation to the user via a display of the client device; generating a modification selectable element that, when selected by the user, causes the transcription that is automatically arranged to be modified; receiving touch input from the user via the display of the client device, the touch input being directed to the transcription of the spoken utterance; and in response to receiving the touch input from the user that is directed to the transcription of the spoken utterance and based on the transcription of the spoken utterance being generated based on the transcription being automatically arranged: causing the modification selectable element to be provided for presentation to the user via the display of the client device.

These and other implementations of the technology disclosed herein can include one or more of the following features.

In some implementations, the method may further include in response to determining that the user has specified the arrangement of the textual data for the transcription: generating, based on the textual data corresponding to the spoken utterance and based on the arrangement specified by the user, the transcription of the spoken utterance; causing the transcription to be provided for presentation to the user via the display of the client device; and refraining from generating the modification selectable element. In some versions of those implementations, the arrangement specified by the user may include a manual punctuation mark provided by the user in the spoken utterance and/or a manual capitalization provided by the user in the spoken utterance.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data corresponding to the spoken utterance; generating, based on the textual data corresponding to the spoken utterance, a transcription of the spoken utterance that is automatically arranged; causing the transcription to be provided for presentation to the user via a display of the client device; generating a modification selectable element that, when selected by the user, causes the transcription that is automatically arranged to be modified; receiving touch input from the user via the display of the client device, the touch input being directed to the transcription of the spoken utterance; and in response to receiving the touch input from the user that is directed to the transcription of the spoken utterance and based on the transcription being automatically arranged: causing the modification selectable element to be provided for presentation to the user via the display of the client device.

These and other implementations of the technology disclosed herein can include one or more of the following features.

In some implementations, the transcription may be automatically arranged to include an automatic paragraph break following a given term that is included in the transcription. In some versions of those implementations, the method may further include receiving additional touch input from the user via the display of the client device, the additional touch input being directed to the modification selectable element; and in response to receiving the additional touch input from the user that is directed to the modification selectable element: causing the transcription to be modified to remove the automatic paragraph break.

In some implementations, the method may further include processing, using one or more automatic arrangement machine learning (ML) models, the audio data that captures the spoken utterance and/or the textual data corresponding to the spoken utterance to generate automatic arrangement data for automatically arranging the transcription. In some versions of those implementations, the one or more automatic arrangement ML models may include an automatic paragraph break ML model, and processing the audio data that captures the spoken utterance and/or the textual data corresponding to the spoken utterance to generate the automatic arrangement data using the one or more automatic arrangement ML models may include processing, using the automatic paragraph break ML model, the audio data that captures the spoken utterance and/or the textual data corresponding to the spoken utterance to identify the automatic paragraph break following the given term that is included in the textual data.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data corresponding to the spoken utterance; generating, based on the textual data corresponding to the spoken utterance, a transcription of the spoken utterance that is automatically arranged; causing the transcription to be provided to a third-party software application executing at least in part at the client device; generating a modification selectable element that, when selected by the user, causes the transcription that is automatically arranged to be modified; and causing the modification selectable element to be provided to the third-party software application executing at the client device.

These and other implementations of the technology disclosed herein can include one or more of the following features.

In some implementations, causing the transcription to be provided to the third-party software application executing at the client device may cause the third-party software application to provide the transcription for presentation to the user via a display of the client device. In some versions of those implementations, causing the modification selectable element to be provided to the third-party software application executing at the client device may cause the third-party software application to provide the modification selectable element for presentation to the user via the display of the client device in response to determining that the user has directed touch input to the transcription.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data corresponding to the spoken utterance; generating, based on the textual data corresponding to the spoken utterance, a transcription of the spoken utterance that is automatically arranged; causing the transcription to be provided to a third-party software application executing at least in part at the client device; and causing automatic arrangement data utilized in automatically arranging the transcription to be provided to the third-party software application executing at the client device.

These and other implementations of the technology disclosed herein can include one or more of the following features.

In some implementations, causing the automatic arrangement data utilized in automatically arranging the transcription to be provided to the third-party software application executing at the client device may cause the third-party software application to generate a modification selectable element that, when selected by the user, causes the transcription that is automatically arranged to be modified.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving audio data that captures a spoken utterance of a user of a client device, the audio data being generated by one or more microphones of the client device;
   processing, using an automatic speech recognition (ASR) model, the audio data that captures the spoken utterance of the user to generate textual data corresponding to the spoken utterance;
   determining, based on the audio data that captures the spoken utterance and/or based on the textual data corresponding to the spoken utterance, whether the user has specified an arrangement of the textual data for a transcription of the spoken utterance;
   in response to determining that the user has not specified the arrangement of the textual data for the transcription:
      generating, based on the textual data corresponding to the spoken utterance, a transcription of the spoken utterance that is automatically arranged, the transcription that is automatically arranged including at least an automatic punctuation mark following a given term that is included in the textual data and an automatic capitalization of a subsequent term that is included in the textual data and that is subsequent to the given term;
      causing the transcription to be provided for presentation to the user via a display of the client device;
      generating a modification selectable element that, when selected by the user, causes the transcription that is automatically arranged to be modified to remove the automatic punctuation mark and/or the automatic capitalization;
      receiving touch input from the user via the display of the client device, the touch input being directed to the transcription of the spoken utterance; and
      in response to receiving the touch input from the user that is directed to the transcription of the spoken utterance and based on the transcription of the spoken utterance being generated based on the transcription being automatically arranged:
         causing the modification selectable element to be provided for presentation to the user via the display of the client device; and
   in response to determining that the user has specified the arrangement of the textual data for the transcription:
      generating, based on the textual data corresponding to the spoken utterance and based on the arrangement specified by the user, the transcription of the spoken utterance;
      causing the transcription to be provided for presentation to the user via the display of the client device; and
      refraining from generating the modification selectable element.

2. The method of claim 1, in response to determining that the user has not specified the arrangement of the textual data for the transcription, further comprising:
   receiving additional touch input from the user via the display of the client device, the additional touch input being directed to the modification selectable element; and
   in response to receiving the additional touch input from the user that is directed to the modification selectable element:
      causing the transcription that is automatically arranged to be modified to remove the automatic punctuation mark and/or the automatic capitalization.

3. The method of claim 2, wherein causing the transcription that is automatically arranged to be modified to remove the automatic punctuation mark and/or the automatic capitalization comprises:
   causing the automatic punctuation mark following the given term that is included in the textual data to be removed; and
   causing the automatic capitalization of the subsequent term that is included in the textual data and that is subsequent to the given term to be removed.

4. The method of claim 3, wherein causing the automatic capitalization of the subsequent term that is included in the textual data and that is subsequent to the given term to be removed comprises:
   supplanting an automatically capitalized first letter of the subsequent term that is included in the textual data and that is subsequent to the given term with a corresponding lowercased first letter of the subsequent term.

5. The method of claim 2, wherein causing the transcription that is automatically arranged to be modified to remove the automatic punctuation mark and/or the automatic capitalization comprises:
   causing the automatic punctuation mark following the given term that is included in the textual data to be removed; and
   refraining from causing the automatic capitalization of the subsequent term that is included in the textual data and that is subsequent to the given term to be removed.

6. The method of claim 5, wherein refraining from causing the automatic capitalization of the subsequent term that is included in the textual data and that is subsequent to the given term to be removed comprises:

determining whether the automatic capitalization of the subsequent term that is included in the textual data and that is subsequent to the given term is an intrinsic capitalization; and in response to determining that the automatic capitalization of the subsequent term that is included in the textual data and that is subsequent to the given term is the intrinsic capitalization:

refraining from causing the automatic capitalization of the subsequent term that is included in the textual data and that is subsequent to the given term to be removed.

7. The method of claim 6, wherein the intrinsic capitalization is an entity reference to an entity.

8. The method of claim 2, wherein the modification selectable element includes a preview of a portion of a modified transcription that is modified to remove the automatic punctuation mark and/or the automatic capitalization.

9. The method of claim 1, wherein determining that the user has not specified the arrangement of the textual data for the transcription is based on determining that the spoken utterance does not explicitly include the automatic punctuation mark following the given term that is included in the transcription and is based on determining that the spoken utterance does not explicitly include the automatic capitalization of the subsequent term that is included in the transcription and that is subsequent to the given term.

10. The method of claim 1, wherein the touch input that is directed to the transcription of the spoken utterance is directed to the automatic punctuation mark following the given term that is included in the textual data.

11. The method of claim 1, wherein the touch input that is directed to the transcription of the spoken utterance is directed to the given term.

12. The method of claim 1, wherein the touch input that is directed to the transcription of the spoken utterance is directed to the subsequent term that is included in the textual data and that is subsequent to the given term.

13. The method of claim 1, wherein the one or more processors are local to the client device of the user.

14. The method of claim 1, in response to determining that the user has not specified the arrangement of the textual data for the transcription, further comprising:

processing, using one or more automatic arrangement machine learning (ML) models, the audio data that captures the spoken utterance and/or the textual data corresponding to the spoken utterance to generate automatic arrangement data for automatically arranging the transcription.

15. The method of claim 14, wherein the one or more automatic arrangement ML models include an automatic punctuation ML model, and wherein processing the audio data that captures the spoken utterance and/or the textual data corresponding to the spoken utterance to generate the automatic arrangement data for automatically arranging the transcription using the one or more automatic arrangement ML models comprises:

processing, using the automatic punctuation ML model, the audio data that captures the spoken utterance and/or the textual data corresponding to the spoken utterance to identify the automatic punctuation mark following the given term that is included in the textual data.

16. The method of claim 14, wherein the one or more automatic arrangement ML models include an automatic capitalization ML model, and wherein processing the audio data that captures the spoken utterance and/or the textual data corresponding to the spoken utterance to generate the automatic arrangement data for automatically arranging the transcription using the one or more automatic arrangement ML models comprises:

processing, using the automatic capitalization ML model, the audio data that captures the spoken utterance and/or the textual data corresponding to the spoken utterance to identify the automatic capitalization of the subsequent term that is included in the textual data and that is subsequent to the given term.

17. A system comprising:

at least one processor; and memory storing instructions that, when executed by the at least one processor, cause the at least one processor to be operable to:

receive audio data that captures a spoken utterance of a user of a client device, the audio data being generated by one or more microphones of the client device;

process, using an automatic speech recognition (ASR) model, the audio data that captures the spoken utterance of the user to generate textual data corresponding to the spoken utterance;

determine, based on the audio data that captures the spoken utterance and/or based on the textual data corresponding to the spoken utterance, whether the user has specified an arrangement of the textual data for a transcription of the spoken utterance;

in response to determining that the user has not specified the arrangement of the textual data for the transcription:

generate, based on the textual data corresponding to the spoken utterance, a transcription of the spoken utterance that is automatically arranged, the transcription that is automatically arranged including at least an automatic punctuation mark following a given term that is included in the textual data and an automatic capitalization of a subsequent term that is included in the textual data and that is subsequent to the given term;

cause the transcription to be provided for presentation to the user via a display of the client device;

generate a modification selectable element that, when selected by the user, causes the transcription that is automatically arranged to be modified to remove the automatic punctuation mark and/or the automatic capitalization;

receive touch input from the user via the display of the client device, the touch input being directed to the transcription of the spoken utterance; and in response to receiving the touch input from the user that is directed to the transcription of the spoken utterance and based on the transcription of the spoken utterance being generated based on the transcription being automatically arranged:

cause the modification selectable element to be provided for presentation to the user via the display of the client device; and in response to determining that the user has specified the arrangement of the textual data for the transcription:

generate, based on the textual data corresponding to the spoken utterance and based on the arrangement specified by the user, the transcription of the spoken utterance;

cause the transcription to be provided for presentation to the user via the display of the client device; and refrain from generating the modification selectable element.

18. A non-transitory computer-readable storage medium storing instructions that, when executed by at least one processor, cause the at least one processor to execute instructions to:

receive audio data that captures a spoken utterance of a user of a client device, the audio data being generated by one or more microphones of the client device;

process, using an automatic speech recognition (ASR) model, the audio data that captures the spoken utterance of the user to generate textual data corresponding to the spoken utterance;

determine, based on the audio data that captures the spoken utterance and/or based on the textual data corresponding to the spoken utterance, whether the user has specified an arrangement of the textual data for a transcription of the spoken utterance;

in response to determining that the user has not specified the arrangement of the textual data for the transcription:

generate, based on the textual data corresponding to the spoken utterance, a transcription of the spoken utterance that is automatically arranged, the transcription that is automatically arranged including at least an automatic punctuation mark following a given term that is included in the textual data and an automatic capitalization of a subsequent term that is included in the textual data and that is subsequent to the given term;

cause the transcription to be provided for presentation to the user via a display of the client device;

generate a modification selectable element that, when selected by the user, causes the transcription that is automatically arranged to be modified to remove the automatic punctuation mark and/or the automatic capitalization;

receive touch input from the user via the display of the client device, the touch input being directed to the transcription of the spoken utterance; and in response to receiving the touch input from the user that is directed to the transcription of the spoken utterance and based on the transcription of the spoken utterance being generated based on the transcription being automatically arranged:

cause the modification selectable element to be provided for presentation to the user via the display of the client device; and in response to determining that the user has specified the arrangement of the textual data for the transcription:

generate, based on the textual data corresponding to the spoken utterance and based on the arrangement specified by the user, the transcription of the spoken utterance;

cause the transcription to be provided for presentation to the user via the display of the client device; and refrain from generating the modification selectable element.

* * * * *